FLUID TEXTURIZING APPARATUS AND METHOD OF USE

Original Filed April 30, 1970 2 Sheets-Sheet 1

INVENTOR
MICHEL BUZANO

BY Sherman & Shallaway
ATTORNEYS

FLUID TEXTURIZING APPARATUS AND METHOD OF USE

Original Filed April 30, 1970 2 Sheets-Sheet 2

INVENTOR
MICHEL BUZANO

BY Sherman & Shallway
ATTORNEYS

United States Patent Office

Re. 28,254
Reissued Nov. 26, 1974

28,254
FLUID TEXTURIZING APPARATUS AND METHOD OF USE

Michel Buzano, Villeurbanne, France, assignor to Rhone-Poulenc-Textile, Paris, France Original No. 3,683,608, dated Aug. 15, 1972, Ser. No. 33,203, Apr. 30, 1970. Application for reissue Aug. 9, 1973, Ser. No. 387,027
Claims priority, application France, May 16, 1969, 6915940
Int. Cl. D02g *1/04, 1/16*
U.S. Cl. 57—77.3 2 Claims

Matter enclosed in heavy brackets [ ] appears in the original patent but forms no part of this reissue specification; matter printed in italics indicates the additions made by reissue.

ABSTRACT OF THE DISCLOSURE

A texturizing apparatus comprising a yarn passage, at least one conduit for the delivery of fluid thereto which conduit feeds the yarn passage non-radially which is further characterized in that it presents a transverse cavity which cuts such yarn passage at a maximum to its axis and into which transverse cavity said fluid supply conduit empties.

The instant invention is directed to a fluid texturizing apparatus and a method for use thereof. In particular, the instant invention is directed to a fluid texturizing apparatus useful in the manufacture of textured yarn which yarn may or may not have a residual twist. Furthermore, the subject invention is directed to a texturizing apparatus which is particularly well suited for use in the continuous manufacture of such textured yarns at high speeds.

The production of yarn having a false twist which has been created pneumatically or by fluid has been known in the art for an extended period of time. Techniques such as those disclosed in French Pat. No. 791,906 have been said to be useful in the preparation of yarns of synthetic plastic material by means of the use of gaseous fluid having turbulent motion. It is to be noted, however, that devices such as those that are disclosed in the above-noted French patent are not suited for use at high speeds. Furthermore, it is also noted that such devices are not economically sound inasmuch as they consume an excessive amount of compressed air thus increasing the cost of the processes employing same. Numerous other devices have been proposed for the pneumatic manufacture of yarns having a false twist. In general, such devices are designed such that the yarn passes through a substantially cylindrical passage which passage serves as a texturizing chamber for said yarn. The fluid employed in texturizing said yarn is delivered to said chamber in a tangential manner by means of a side conduit into said yarn passageway. It is to be noted, however, that the industrial skill use of such an apparatus has resulted in numerous difficulties, particularly inasmuch as said apparatuses are extremely difficult to reproduce uniformly. That is to say, that inasmuch as the passages in said apparatus must be machined to extremely small diameters of the order of a few tenths of a millimeter over lengths of several centimeters, the production thereof becomes extremely delicate. The uniformity of such conduits is especially critical when considering the fluid inlet inasmuch as it has been found that the ultimate product varies with variations therein. That is to say, that it has been found that instead of having perfectly straight passages, such conduits are either slightly concave or convex because of the difficulties associated with the manufacture thereof. This results in products which are not identical when said products are manufactured with different apparatus. It is, of course, readily apparent that uniformity of the ultimate yarn product is highly desirable and, therefore, the above-noted apparatus has been found to be unsuitable for the manufacture of uniformly texturized yarns. The difficulties noted above are further amplified by the fact that in the preparation of such conduits it is nearly impossible to control the machine using conventional metallurgical means. As a result thereof, specialized techniques have been developed, however, such techniques result in an exceedingly high cost for the nozzles previously employed.

Therefore, it is an object of the instant invention to provide a texturizing apparatus which overcomes all of the above-noted difficulties.

A further object of the instant invention is to provide a texturizing apparatus whereby one can obtain a uniform product from a high speed continuous operation which utilizes several such apparatus.

Yet another object of the instant invention is to provide a texturizing apparatus, the use of which is economically more favorable than those previously employed.

These and other objects of the instant invention will become more evident from the following more detailed description thereof.

The texturizing apparatus of the instant invention comprises a yarn passage, at least one conduit for the delivery of fluid which supplies said yarn passage nonradially, and a transverse cavity which cuts said yarn passage at the most to its axis. Said fluid delivery conduit is designed so that it opens into said yarn passage as discussed above. The subject yarn which is produced by passage through said apparatus can be employed in any conventional application such as knitting, weaving, and the like. Furthermore, it is noted that the subject apparatus is useful in connection with all thermoplastic yarns and, therefore, allows the preparation of texturized elastic yarns which may or may not contain a residual twist.

The subject apparatus may, of course, be modified within the skill of those in the art and such modifications are considered within the scope of the instant invention. That is to say, that said yarn passageway may have a circular or non-circular cross section and further may either be regular or regular. The fluid delivery conduit discussed above may have a construction and/or blockage upstream from said transverse cavity, said constriction and/or blockage being provided by a diaphragm or the like. It is also noted that said fluid delivery conduit may have any one of several cross sectional shapes, such as circular or non-circular, regular or non-regular, and the like. In connection with the transverse cavity, it is noted that said cavity may be of any desired shape or form. In practice, however, it has been found preferable primarily because of machining reasons to employ a simple geometric form such as a circle, a sector of a circle, a parallelepiped, a trapezoid, and the like.

The subject apparatus may be manufactured by any one of several techniques. It has been found preferable, however, to manufacture said apparatus in two or more parts, i.e., two half blocks. It is noted, however, that said apparatus may be manufactured in separate pieces so as to facilitate the machining of the conduits and openings therein.

According to the preferred embodiment of the instant invention, the subject apparatus comprises a body, a yarn passage, at least one conduit for delivery of fluid thereto, said conduit feeding the yarn passage non-radially, i.e., feeding such passage in a plane other than that of a radian so that the axis of the conduit and axis of the yarn passage do not intersect. The above-noted body comprises an elongated piece, a cross piece, comprising a yarn passage and at least one transverse slit cutting said yarn passage at most to its axis. The body also contains said fluid delivery passage that empties into said transverse slit, said elongated body piece being disposed in such a way that the fluid delivery conduit empties into said slit non-tangentially with respect to the yarn passage.

According to the above-noted preferred embodiment, a change in the direction of the residual twist may readily be accomplished by rotating the elongated piece that crosses said body with reference to said body without changing the apparatus as is required in the case of the presently used apparatus.

Preferably, said elongated piece comprises the hollow tube of a strong material such as tungsten carbide in a shape such as polygonal, oval, circular, prismatic, truncated, and the like. Generally, the apparatus of the instant invention presents a single transverse cavity which is substantially perpendicular to the yarn passage. According to another embodiment of the instant invention, however, said transverse cavity may be directed obliquely downstream so as to add to the apparatus an additional effect of traction of the yarn. A still further embodiment of the instant invention may present at least two transverse cavities with identical and/or different orientations. Moreover, the subject apparatus may present external positioning means such as projections and/or catches which facilitate the positioning of said apparatus into location.

As previously noted, the apparatus of the instant invention may be employed in providing effects such as pneumatic false twists, and may, therefore, be employed in a manner similar to that previously employed in connection with such apparatus. It is also noted that the subject apparatus may be employed in connection with any synthetic yarns.

The treatment of yarn according to the instant invention, i.e., employing the subject apparatus hereof, constitutes a new process in which texturizing fluid is directed non-radially into the yarn passage through an intermediate volume, cutting said yarn passage into which intermediate volume said fluid delivery conduit empties. Preferably, the transverse section of this intermediate volume and/or transverse slit covers less than one half of the transverse section of the yarn passage. It is also noted that it is preferred that the fluid jet is directed into said yarn passage at an angle which does not substantially exceed 45° with the plane tangent to the middle of the transverse cavity cutting the yarn passage.

The instant invention will now be illustrated by reference to the following figures which serve as examples of the preferred embodiments as disclosed herein. It is to be noted that such figures are not deemed as being limiting on the instant invention but rather merely serve to illustrate same.

Figure 1:
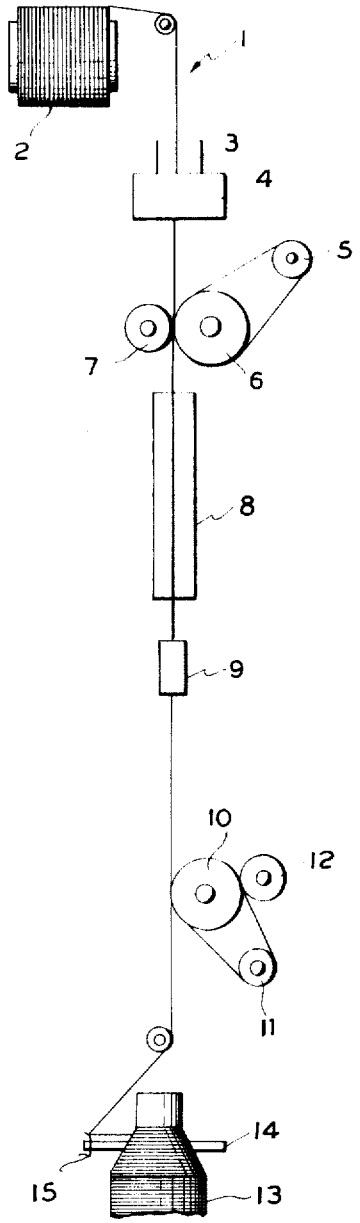
FIG. 1 shows an overall diagram of a continuous apparatus for use in the drawing in texturizing of yarns which apparatus includes the subject texturizing device.

In FIG. 1 the yarn 1 is taken from a spool 2 and drawn between a set of delivery rollers 3 and 4 and a set of draw rollers 5 and 6 which are associated with a roller press 7 and then passes over heating plate 8 prior to passing through the subject apparatus 9. Subsequent to treatment in the subject apparatus, the yarn, then passes over a set of relaxer rollers 10 and 11 to an untwist blocker constituted by a roller 12 prior to being wound on a cop 12 by means of a device comprising a ring 14 and a runner 15.

Figure 2:
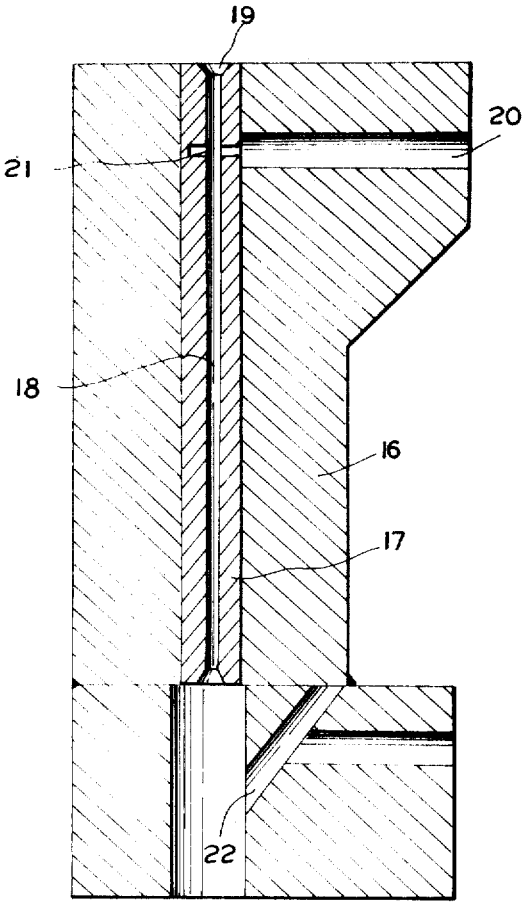
FIG. 2 is a schematic view of the subject apparatus of the instant invention.

According to FIG. 2, the apparatus of the instant invention is comprised of a body 16 which encloses a passageway tube 17 with a substantially cylindrical axial conduit 18 which conduit serves as a yarn passageway. It is noted that the subject apparatus also includes a cone 19 for the introduction of yarn. The fluid employed in connection with the subject process is delivered to the apparatus via conduit 20, which empties into slit 21 which slit is substantially perpendicular to tube 17 and presents a rectangular longitudinal section, with said slit corresponding to a sector of a circle as is better illustrated in FIG. 3 wherein the border of slit 21 intersects yarn passageway 18 at a maximum of 180° so that yarn passageway 18 has at least 180° within tube 17.

Figure 4:
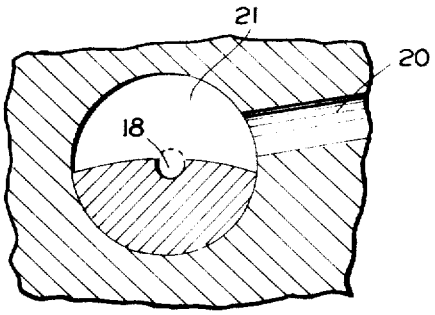
Figure 5:
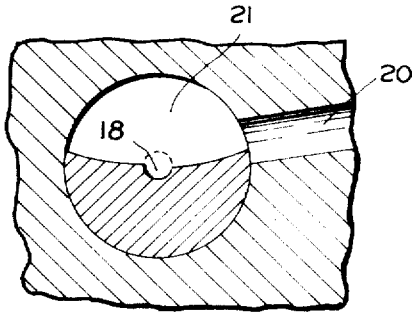

According to the preferred embodiments of the instant invention, said slit may comprise a sector of a circle which may be either convex or concave which is more clearly illustrated in FIGS. 4 and 5. According to still further preferred embodiments of the instant invention, the evacuation of the yarn from the passageway may be facilitated by the use of a second air jet which supplies a thrust to the yarn downstream of the fluid conduit. The fluid in said jet may be introduced via a second conduit illustrated as 22 in FIG. 2 which is obliquely directed downward.

The instant invention will now be illustrated by the following more detailed examples thereof. It is to be noted, however, that the instant invention is not deemed as being limited thereby.

EXAMPLE 1

Figure 3:
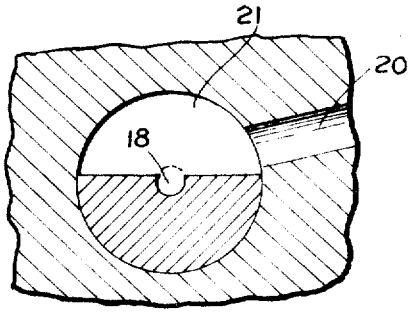
FIGS. 3, 4 and 5 show sections of the conduit corresponding to the preferred embodiments of the instant invention.

Employing a device similar to that disclosed in FIG. 3 above having a yarn passage conduit diameter six-tenths millimeters a distance from the axis of the yarn passage conduit to the bottom of the straight slit of 12/100 millimeters and a transverse slit having a width of six-tenths millimeters, a yarn of polyhexamethylene adipamide (polyamide 6.6) having 95 dtex/2 strands was prepared employing the following conditions:

| | |
|---|---|
| Degree of drawing | 4.3 |
| Drawing rate ____m./min. | 600 |
| Plate 8 temperature ____° C. | 240 |
| Excess feed between rollers **5**, **6**, **7** and **9**, **10** percent | 14 |
| Air pressure at the entrance to the nozzle ___kg./cm.$^2$ | 5 |
| Flow of air brought to normal conditions of temperature and pressure ____m.$^3$/hr. | 0.8 |
| Angle of the axis of the delivery conduit for fluid with reference to the tangent to the slit ___degrees | 0 |

The product yarn which resulted from the loom had a residual twist of 990 turns/meter as measured according to the following technique.

A 1.5 meter length of yarn was attached by one end to a fixed point A and the yarn was subsequently passed through a hook whose weight was calculated to correspond to 0.006 g./dtex and a second fixed point B which was 75 cm. on the vertical from the first point. The yarn was then carried to the first point where its end was fixed. The yarn was then fed from the second fixed point with removal of the hook and allowed to twist itself and the roping twist was determined by means of a torsiometer of known type.

A double drop circular 420 needle loom with a diameter of 375 inches was employed to knit a stocking of this yarn as jersey alternating courses of the yarn with residual S twist with courses of yarn with residual Z twist, said two yarns being produced by the device noted above with rotation of the tube 180°. The resulting stocking was set at 100° C. for 20 minutes and then dyed at 85° C. for 3 hours and blocked at 125° C. for 90 seconds.

The following tests were then performed on the stocking which resulted. A 100 mm. length of the stocking as it was removed from the loom was laid flat in a relaxed state, said stocking before any thermal treatment was wound on a cylindrical tube 80 mm. in diameter and suspended with a weight from its free end so as to measure the elongation thereof. The load was then removed and the stocking was again laid flat and the distance separating the reference marks which were originally 100 mm. part was measured so as to obtain the contraction length. The same measurement was repeated after blocking so as to obtain the length in the block state and the contraction after blocking.

As a result of the foregoing procedure when employed with two different weights, namely 300 g. and 1 kg. the following results were obtained:

| | Elongation in mm. | Contraction length |
|---|---|---|
| Load before heat treatment: | | |
| 300 g | 180 | 105 |
| 1 kg | 370 | 110 |
| Load in blocked state: | | |
| 300 g | 160 | 105 |
| 1 kg | 300 | 108 |

It is noted that the subject stockings had a substantial elasticity and a significant elastic contraction in light of the fact that said stockings at the maximum elongation quickly return to a length which is very close to the original length.

EXAMPLE 2

The procedure of Example 1 was repeated with the exception that the following characteristics were changed:

| | | |
|---|---|---|
| Drawing rate | m./min | 900 |
| Plate temperature | ° C | 245 |
| Excess feed | percent | 13 |
| Air flow | m.³/hr | 0.9 |

a result of the use of the foregoing conditions, a yarn was obtained whose residual twist as it came from the knitting frame was 450 t./m.

EXAMPLE 3

A polyhexamethylene adipamide yarn 152 dtex/13 strands was treated employing the device as disclosed in FIG. 1 utilizing the apparatus of FIG. 3 with a tube having an internal diameter of 10/10 mm. and a distance of longitudinal axis to the bottom of the slit of 15/100 mm. and a slit width eight-tenths mm. under the following operative conditions:

| | | |
|---|---|---|
| Degree of drawing | | 3.45 |
| Rate of drawing | m./min | 350 |
| Plate temperature | ° C | 240 |
| Excess feed | percent | 15 |
| Air pressure at the nozzle entrance | kg./cm.³ | 5 |
| Air flow | m.³/hr | 2 |
| Angle of the axis of the delivery conduit for fluid with the tangent to the slit | degrees | 0 |

A yarn was obtained which presented the following characteristics:

| | | |
|---|---|---|
| Bulk effect | percent | 180 |
| Residual torsion couple | | 0 |
| Bulk | cm.³/g | 3 |
| Creep | percent | 4 |

Bulk was determined by the Koningh test.

The bulk effect was determined by measuring the yarn under a load of 0.045 g./dtex which gives a length $l_1$. The yarn was then left 24 hours under a load of 0.0009 g./dtex and measured to obtain a new length $l_2$. The bulk effect was determined by the ratio $$\frac{l_1-l_2}{l_1}\times 100$$

The creep was determined by the permanent deformation assumed by a yarn after application of a load equal to 40 percent of the theoretical break load.

EXAMPLE 4

A polyethylene terephthalate yarn of 55 dtex/22 strands was testured according to the following procedure.

The yarn was drawn through the apparatus of the instant invention as employed in Example 3 under the following operating conditions:

| | | |
|---|---|---|
| Temperature of the texturizing plate | ° C | 245 |
| Degree of excess feed | percent | 12 |
| Pressure | kg./cm.¹ | 5 |
| Air Flow | m.¹/ht | 2 |
| Rate of Feed | m./min | 400 |

The yarn which was obtained had the following characteristics:

| | | |
|---|---|---|
| Bulk | cm.³/g | 25 |
| Bulk effect | percent | 23 |
| Creep | percent | 4.3 |
| Residual torsion couple | | 0 |

As is readily apparent from the foregoing examples and drawings, the apparatus of the instant invention provides a process for high speed texturizing either continuously or batchwise of the yarns so as to obtain a yarn which may or may not have the residual twist. Furthermore, the apparatus of the instant invention is ideally suited to be mass produced with extremely close tolerance and, therefore, allows for the preparation of yarn uniformly no matter which particular apparatus is employed. It is also noted that by virtue of the uniformity of production of said apparatus the consumption of air employed in said process may be minimized so as to improve the economics of the use thereof.

What is claimed is:

1. A texturizing apparatus comprising:

a body having a first conduit and a second conduit, said second conduit being perpendicular to said first conduit; and a hollow tube having outer dimensions substantially the same as the inner dimensions of said first conduit, said tube contacting said first conduit, said tube having a cylindrical conduit therethrough, said tube having a slit perpendicular to said cylindrical conduit said slit communicating said second conduit with said cylindrical conduit, said slit having a border intersecting said cylindrical conduit at a maximum of 180°, said second conduit being positioned so that fluid is directed non-tangentially to said cylindrical conduit the plane of the axis of said second conduit being perpendicular to the axis of said cylindrical conduit and the axis of said second conduit non-intersecting the axis of said cylindrical conduit.

2. A process for preparing a texturized yarn comprising passing said yarn through a yarn passage and contacting said yarn with a fluid flowing into a slit from a conduit intersecting said yarn passage at a maximum of 180°, said fluid being directed non-tangentially to said yarn passage and the axis of said conduit non-intersecting the axis of said yarn passage so as to impart a false twist to the yarn.

References Cited

The following references, cited by the Examiner, are of record in the patented file of this patent or the original patent.

UNITED STATES PATENTS

| | | | |
|---|---|---|---|
| 2,990,671 | 7/1961 | Bunting, Jr., et al. | 57—34 D |
| 3,079,745 | 3/1963 | Breen et al. | 57—77.3 X |
| 3,206,922 | 9/1965 | Nagahara et al. | 57—77.3 |
| 3,279,164 | 10/1966 | Breen et al. | 57—34 AT |
| 3,353,344 | 11/1967 | Clendening, Jr. | 28—1.4 X |
| 3,460,213 | 8/1969 | Ensslim et al. | 28—1.4 |
| 3,488,671 | 1/1970 | Welben et al. | 28—1.4 |

JOHN PETRAKES, Primary Examiner

U.S. Cl. X.R.

28—1.4; 57—34 B, 34 HS, 157 TS, 157F